(12) United States Patent
Feder et al.

(10) Patent No.: US 8,843,264 B2
(45) Date of Patent: Sep. 23, 2014

(54) METHOD AND APPARATUS FOR OPERATION OF A MOTOR VEHICLE

(75) Inventors: Johannes Feder, Neutraubling (DE); Björn Kattentidt, Neutraubling (DE); Stefan Maier, Regensburg (DE); Martin Prenninger, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 825 days.

(21) Appl. No.: 12/442,620

(22) PCT Filed: Sep. 28, 2007

(86) PCT No.: PCT/EP2007/060313
§ 371 (c)(1),
(2), (4) Date: Jun. 16, 2010

(87) PCT Pub. No.: WO2008/037796
PCT Pub. Date: Apr. 3, 2008

(65) Prior Publication Data
US 2010/0256854 A1 Oct. 7, 2010

(30) Foreign Application Priority Data
Sep. 29, 2006 (DE) .......................... 10 2006 046 216

(51) Int. Cl.
*G06F 7/00* (2006.01)
*B60W 50/16* (2012.01)

(52) U.S. Cl.
CPC ..................................... *B60W 50/16* (2013.01)
USPC ....... 701/29.2; 701/29.1; 701/33.5; 701/33.6; 701/33.7; 701/34.4

(58) Field of Classification Search
CPC ........... F16H 61/12; B60T 8/88; B60T 8/885; F02D 41/22; F02D 41/221; F02D 41/222; B60W 2050/0205; B60W 2050/021; B60W 2050/0215; B60W 2050/022; B60W 2050/04; B60W 2050/14; B60W 50/16; B60W 50/14; B60W 50/12
USPC .............. 701/29, 29.1, 29.7, 30.3, 30.8, 30.5, 701/34.4, 34.3, 29.6, 101, 103, 105, 107, 701/110, 54, 29.2, 30.9, 31.1, 31.2, 33.5, 701/33.7–34.1; 340/438, 901–903, 407.1, 340/965; 180/271; 123/198 D, 479, 319, 123/351, 352; 477/902, 906; 116/205
See application file for complete search history.

(56) References Cited

U.S. PATENT DOCUMENTS 3,961,598 A * 6/1976 Krieger .......................... 116/205
4,429,670 A * 2/1984 Ulanet ....................... 123/198 D
(Continued)

FOREIGN PATENT DOCUMENTS

DE 4124515 A1 1/1993
DE 19923012 A1 11/2000
(Continued)

*Primary Examiner* — Thomas G Black
*Assistant Examiner* — Sara Nelson
(74) *Attorney, Agent, or Firm* — King & Spalding L.L.P.

(57) ABSTRACT

For operation of a motor vehicle (2) having a propulsion system (4), when a critical operating state (STATE_CRIT) occurs and/or an operating error (ERROR) of the motor vehicle (2) and/or of the propulsion system (4) of the motor vehicle (2) occurs, the critical operating state (STATE_CRIT) and/or the operating error (ERROR) are signalled to a driver of the motor vehicle (2) by a reaction of the propulsion system (4) and/or by a reaction of the motor vehicle (2) which can be perceived by the driver.

15 Claims, 3 Drawing Sheets

(56) References Cited

U.S. PATENT DOCUMENTS

| | | | |
|---|---|---|---|
| 4,488,521 A * | 12/1984 | Miller et al. | 123/179.3 |
| 4,619,110 A * | 10/1986 | Moore | 60/39.091 |
| 4,899,706 A * | 2/1990 | Sasaki | 123/198 D |
| 5,070,832 A * | 12/1991 | Hapka et al. | 123/198 D |
| 5,263,448 A * | 11/1993 | Bluhm et al. | 123/396 |
| 5,315,972 A * | 5/1994 | Judy et al. | 123/198 D |
| 5,530,651 A * | 6/1996 | Uemura et al. | 701/301 |
| 6,362,729 B1 * | 3/2002 | Hellmann et al. | 340/436 |
| 6,405,132 B1 * | 6/2002 | Breed et al. | 701/301 |
| 6,488,109 B1 * | 12/2002 | Igaki et al. | 180/169 |
| 6,611,745 B1 * | 8/2003 | Paul | 701/41 |
| 6,823,251 B1 * | 11/2004 | Giers | 701/76 |
| 7,112,107 B1 * | 9/2006 | Torgerud | 440/2 |
| 7,184,878 B2 * | 2/2007 | Malone et al. | 701/112 |
| 7,542,843 B2 * | 6/2009 | Malone et al. | 701/112 |
| 7,570,156 B2 * | 8/2009 | Cicilloni et al. | 340/435 |
| 7,589,643 B2 * | 9/2009 | Dagci et al. | 340/905 |
| 7,609,150 B2 * | 10/2009 | Wheatley et al. | 340/436 |
| 7,683,765 B2 * | 3/2010 | Requejo et al. | 340/438 |
| 7,685,810 B2 * | 3/2010 | Hirata et al. | 60/277 |
| 7,696,863 B2 * | 4/2010 | Lucas et al. | 340/435 |
| 7,714,701 B2 * | 5/2010 | Altan et al. | 340/407.1 |
| 7,783,403 B2 * | 8/2010 | Breed | 701/45 |
| 2002/0107631 A1 * | 8/2002 | Hirata | 701/107 |
| 2002/0128774 A1 * | 9/2002 | Takezaki et al. | 701/211 |
| 2003/0156021 A1 * | 8/2003 | Tabata et al. | 340/442 |
| 2004/0167702 A1 * | 8/2004 | Isogai et al. | 701/96 |
| 2005/0161279 A1 * | 7/2005 | Kato et al. | 180/443 |
| 2005/0216169 A1 * | 9/2005 | Arai | 701/96 |
| 2006/0125654 A1 * | 6/2006 | Liao et al. | 340/902 |
| 2006/0157026 A1 * | 7/2006 | Ishida et al. | 123/396 |
| 2007/0010945 A1 * | 1/2007 | Shoda et al. | 701/301 |
| 2007/0109104 A1 * | 5/2007 | Altan et al. | 340/407.1 |
| 2008/0283024 A1 * | 11/2008 | Gregorio | 123/399 |

FOREIGN PATENT DOCUMENTS

| | | | |
|---|---|---|---|
| DE | 10326358 A1 | | 12/2004 |
| DE | 102005052634 A1 * | | 5/2007 |
| EP | 1375232 A1 * | | 1/2004 |
| EP | 1426230 A2 | | 6/2004 |
| EP | 1500574 A2 * | | 1/2005 |
| JP | 09207801 A * | | 8/1997 |
| JP | 2001163131 A * | | 6/2001 |
| WO | WO 2005084922 A1 | | 9/2005 |

* cited by examiner

METHOD AND APPARATUS FOR OPERATION OF A MOTOR VEHICLE

CROSS-REFERENCE TO RELATED APPLICATIONS

This application is a United States national phase filing under 35 U.S.C. §371 of International Application No. PCT/EP2007/060313, filed Sep. 28, 2007 which claims priority to German Patent Application No. 10 2006 046 216.5, filed Sep. 29, 2006. The complete disclosure of the above-identified application is hereby fully incorporated herein by reference.

TECHNICAL FIELD

The invention relates to a method and an apparatus for operating a motor vehicle. The motor vehicle incorporates a drive system.

BACKGROUND

Modern motor vehicles usually have driver information systems. A driver information system of this kind generally comprises an optical and/or an acoustic output unit, e.g. a screen or a loudspeaker. In the event of the occurrence of an operating error of the drive system and/or of the motor vehicle, this can be signaled to a driver of the motor vehicle by the driver information system. However, the visual and/or audible signaling of the operating error may distract the driver from the current traffic situation and place him in a hazardous traffic situation.

SUMMARY

According to various embodiments, a method and an apparatus for operating a motor vehicle may be created which provides a simple means o enabling the motor vehicle to be driven safely.

According to an embodiment, in a method for operating a motor vehicle having a drive system, in the event of the occurrence of a critical operating state and/or an operating error of the motor vehicle and/or of the drive system of the motor vehicle, the critical operating state and/or the operating error is signaled to a driver of the motor vehicle by a reaction of the drive system and/or by a reaction of the motor vehicle perceptible to the driver.

According to a further embodiment, the critical operating state and/or the operating error of the motor vehicle and/or of the drive system of the motor vehicle are evaluated and, depending on the evaluation, an intensity of the reaction of the drive system and/or of the perceptible reaction of the motor vehicle may be determined and the reaction of the drive system and/or the perceptible reaction of the motor vehicle may be implemented with the intensity determined. According to a further embodiment, the longer the time duration for which the critical operating state and/or the operating error of the motor vehicle and/or of the drive system of the motor vehicle is present, the greater the intensity of the reaction of the drive system and/or the greater the intensity of the perceptible reaction of the motor vehicle may be. According to a further embodiment, the reaction of the drive system may involve a variation of a set position of an actuator around a predetermined set position of the actuator. According to a further embodiment, the position of the actuator may affect a torque produced by the drive system and/or an rpm of the drive system and/or a velocity of the motor vehicle. According to a further embodiment, the reaction of the drive system may involve a variation of a resistance of an accelerator pedal of the drive system. According to a further embodiment, the critical operating state and/or the operating error of the motor vehicle and/or of the drive system of the motor vehicle may be signaled to the driver by a perceptible movement of the steering wheel of the motor vehicle.

According to another embodiment, an apparatus for operating a motor vehicle may have a drive system, which, in the event of the occurrence of a critical operating state and/or an operating error of the motor vehicle and/or of the drive system of the motor vehicle, is designed to signal the critical operating state and/or the operating error to a driver of the motor vehicle by a reaction of the drive system and/or by a reaction of the motor vehicle perceptible to the driver.

BRIEF DESCRIPTION OF THE DRAWINGS

The invention will now be explained in greater detail with reference to the accompanying schematic drawings in which.

Elements of identical design or function are denoted by the same reference characters throughout the Figures.

DETAILED DESCRIPTION

Figure 1:
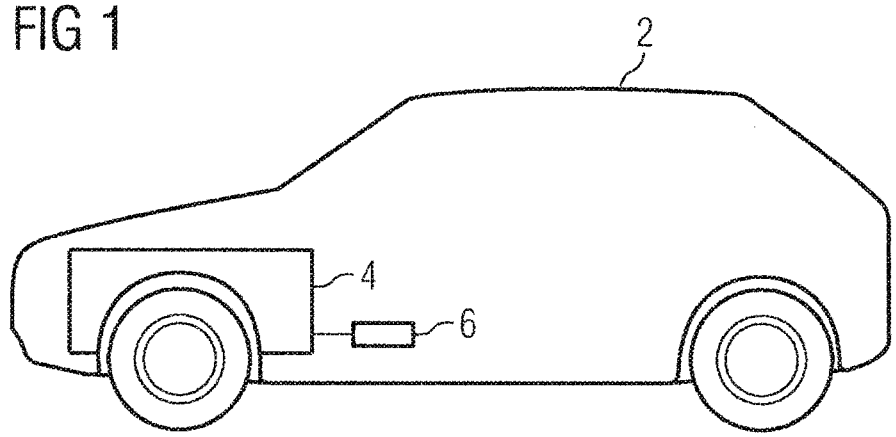
FIG. 1 shows a motor vehicle.
Figure 2:
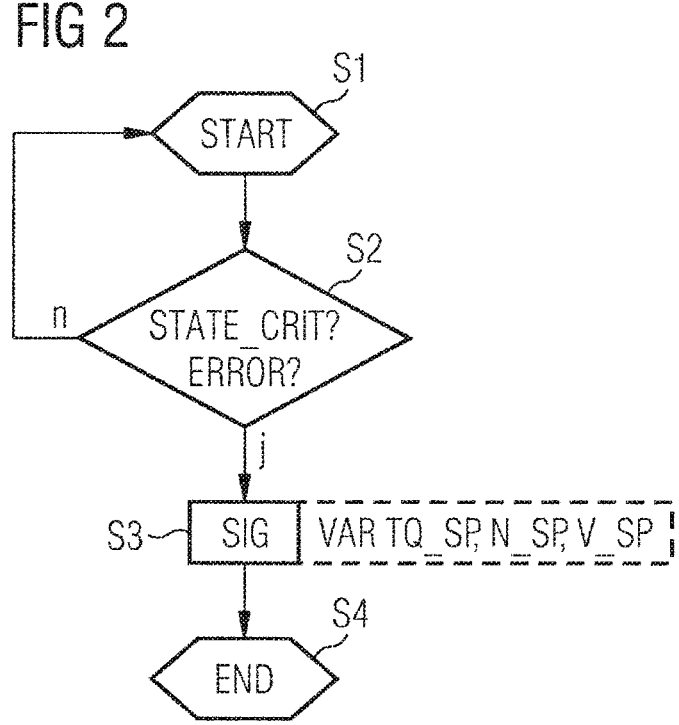
FIG. 2 shows a program for operating the motor vehicle.

According to various embodiments, a method and an apparatus for operating a motor vehicle will be described. The motor vehicle incorporates a drive system. In the event of the occurrence of a critical operating state and/or an operating error of the motor vehicle and/or of the drive system of the motor vehicle, the critical operating state and/or the operating error is signaled to a driver of the motor vehicle by a drive system reaction and/or by a motor vehicle reaction that can be felt by the driver. This enables the occurrence of the critical operating state or of the operating error to be signaled to the driver in a particularly intuitive manner without the distraction of a visual and/or audible signal.

In an embodiment of the method, the critical operating state and/or the operating error of the motor vehicle and/or of the drive system of the motor vehicle are evaluated. An intensity of the reaction of the drive system and/or of the perceptible reaction of the motor vehicle is determined as a function of the evaluation. The reaction of the drive system and/or the perceptible reaction of the motor vehicle is implemented with the intensity determined. This provides a simple means of signaling to the driver whether the operating state is particularly critical and/or whether the operating error is serious or not serious.

In another embodiment of the method, the intensity of the reaction of the drive system and/or the intensity of the perceptible reaction of the motor vehicle is increased the longer the duration for which the critical operating state and/or the operating error of the motor vehicle and/or of the drive system of the motor vehicle is present. This helps to induce the driver to promptly park the motor vehicle and/or take it to a garage before the critical operating state and/or the operating error results in a critical driving situation and/or serious damage to the motor vehicle, particularly to the drive system.

In another embodiment of the method, the drive system reaction involves varying a set position of an actuator around a predefined set position of the actuator, thereby providing a simple means of producing the drive system reaction.

In another embodiment of the method, the position of the actuator affects a torque produced by the drive system and/or an rpm of the drive system and/or a velocity of the motor vehicle. This helps to inform the driver in a particularly intuitive manner about the critical operating state or the operating error using an effective signaling effect.

In another embodiment of the method, the drive system reaction involves varying a resistance of an accelerator pedal of the drive system. This helps to inform the driver in a particularly intuitive manner about the critical operating state or the operating error using an effective signaling effect.

In another embodiment of the method, the critical operating state and/or the operating error of the drive system is signaled to the driver by a perceptible movement of the steering wheel of the motor vehicle. This helps to inform the driver in a particularly intuitive manner about the critical operating state or the operating error using an effective signaling effect.

The embodiments of the method are readily transferrable to embodiments of the apparatus.

A motor vehicle 2 (FIG. 1) incorporates a drive system 4 and preferably a driver information system 6. The drive system 4 preferably comprises an internal combustion engine and/or an electric motor.

An electronic control unit of the drive system 4 can detect a critical operating state STATE_CRIT of the drive system 4. The critical operating state STATE_CRIT can be characterized, for example, in that an element of the drive system 4 fails and/or shows an implausible behavior and/or that a measured value of the drive system 4 enters a range in which it is probable that an operating error (ERROR) occurs. The electronic control unit can also be termed an apparatus for operating the drive system 4.

If the critical operating state STATE_CRIT is triggered by the defective element of the drive system 4, the drive system 4 can nevertheless continue to be operated normally. The occurrence of the operating error (ERROR), on the other hand, necessitates limited operation (LIMIT) of the drive system 4, as otherwise serious damage may be caused to the drive system 4 and/or the motor vehicle 2. The element of the drive system 4 comprises e.g. a sensor and/or an actuator of the drive system 4. The actuator can be, for example, a throttle valve, an intermittent charge valve, an injection valve, a spark plug or any other actuator of the drive system 4.

During limited operation (LIMIT), for example, an upper torque limit value can be placed on a setpoint value TQ_SP of a torque developed by the drive system 4 and/or an upper velocity limit value can be placed on a setpoint value V_SP of a velocity of the motor vehicle 2 and/or an upper rpm limit value can be placed on a setpoint value N_SP of an rpm of the drive system 4.

The switchover to limited operation (LIMIT) of the drive system 4 can result in an abrupt loss of power of the drive system 4. To ensure that the driver is not taken by surprise by the loss of power, which may result in a dangerous driving situation, it is preferably signaled to the driver during the critical operating STATE_CRIT prior to the occurrence of the operating error (ERROR) that the drive system 4 is in the critical operating state STATE_CRIT. The occurrence of the operating error (ERROR) can be alternatively or additionally signaled to the driver.

The onset of the critical operating state STATE_CRIT or the occurrence of the operating error (ERROR) is signaled to the driver by a reaction of the drive system 4 and/or by a reaction, perceptible to the driver, of the motor vehicle 2.

The reaction of the drive system 4 preferably involves a variation VAR of a set position of an actuator of the drive system 4 about a predefined set position of the corresponding actuator. The position of the actuator advantageously affects the torque, the rpm and/or the velocity. Alternatively or additionally, the reaction of the drive system 4 can be an adjustment of a resistance of an accelerator pedal of the drive system 4. The driver then detects e.g. from the stronger resistance that the drive system 4 is in the critical operating state STATE_CRIT and/or that the operating error (ERROR) is present.

The predefined set position of the actuator is preferably predefined by a requirement of the driver of the motor vehicle 2 in order to implement his driver request. The driver request can be e.g. a required torque, a required rpm and/or a required velocity of the motor vehicle 2. The variation VAR of the set position is preferably a periodic fluctuation of the set position within a predefined position range about the predefined set position.

The perceptible reaction of the motor vehicle 2 can include, for example, a vibration alarm of the driver information system 6. The vibration alarm can, for example, be linked to a steering wheel and/or a driver's seat of the motor vehicle 2. The perceptible reaction of the motor vehicle 2 can alternatively or additionally be produced by at least one actuator controlling an item of running gear of the motor vehicle 2.

A program for operating the motor vehicle 2 is preferably stored on a storage medium of the electronic control unit of the drive system 4. The program is used to inform the driver of the occurrence of the critical operating state STATE_CRIT when the critical operating STATE_CRIT occurs and likewise promptly warn him if necessary prior to the occurrence of the operating error (ERROR) and the associated switchover to limited operation (LIMIT). Alternatively or additionally, the program can be used to warn the driver if the operating error (ERROR) occurs. The program is preferably launched in a step S1 simultaneous with startup of the drive system 4. Variables are likewise initialized in step S1.

In a step S2 it is checked whether the critical operating state STATE_CRIT is present, and/or whether the operating error (ERROR) is present. If the condition of step S2 is not fulfilled, processing is continued again in step S1. If the condition of step S2 is fulfilled, processing is continued in a step S3.

In step S3 a signal SIG is generated for signaling the critical operating state STATE_CRIT. The signal SIG preferably includes the variation VAR of a setpoint value TQ_SP of a torque produced by the drive system 4, the variation VAR of a setpoint value N_SP of an rpm of the drive system 4 and/or the variation VAR of the setpoint value V_SP of the velocity of the motor vehicle 2.

The program can be terminated in a step S4. Preferably, however, the program is run regularly during operation of the motor vehicle 2. In addition, switchover to limited operation (LIMIT) can occur on termination of the program.

Figure 3:
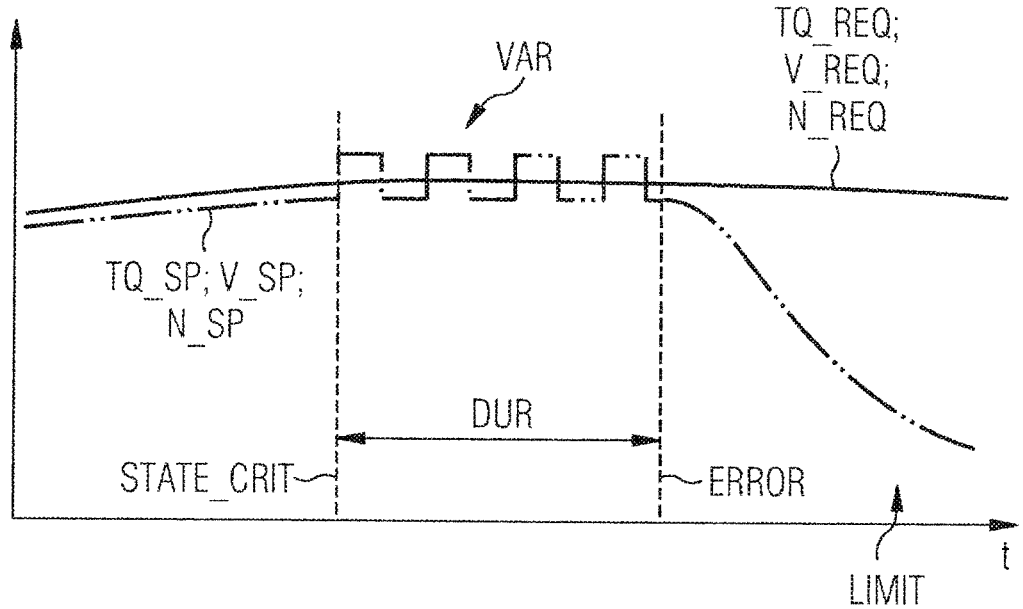
FIG. 3 shows a first setpoint value curve.

The setpoint value TQ_SP of the torque produced by the drive system 4, the setpoint value V_SP of the velocity of the motor vehicle 2 and/or the setpoint value N_SP of the rpm of the drive system 4 can be varied e.g. according to a square-wave signal (FIG. 3). The variation VAR preferably takes place within a torque range, a velocity range and an rpm range about a torque request TQ_REQ, velocity request V_REQ and rpm request N_REQ respectively. In FIG. 3 the setpoint values and the requests are slightly offset with respect to each another so that the lines can be differentiated from one another. Outside the schematic illustration according to FIG. 3 the setpoint values preferably correspond to the requests.

When the critical operating state STATE_CRIT has come about, at least one of the setpoint values is preferably modulated with the predefined variation VAR until a predefined time duration DUR has elapsed and/or until the critical operating state STATE_CRIT no longer obtains and/or until the operating error (ERROR) occurs and switchover to limited operation (LIMIT) takes place.

Preferably an amplitude of the variation VAR is determined as a function of an evaluation of the critical operating state STATE_CRIT and/or as a function of an evaluation of the operating error (ERROR) possibly occurring. Thus a serious critical operating state STATE_CRIT or a serious operating error (ERROR) can produce a strong reaction of the drive system 4 corresponding, for example, to a large amplitude of the variation VAR, while a relatively harmless critical operating state STATE_CRIT or a harmless operating error (ERROR) may only produce a slight reaction of the drive system 4 corresponding, for example, to a small amplitude of the variation VAR.

Figure 4:
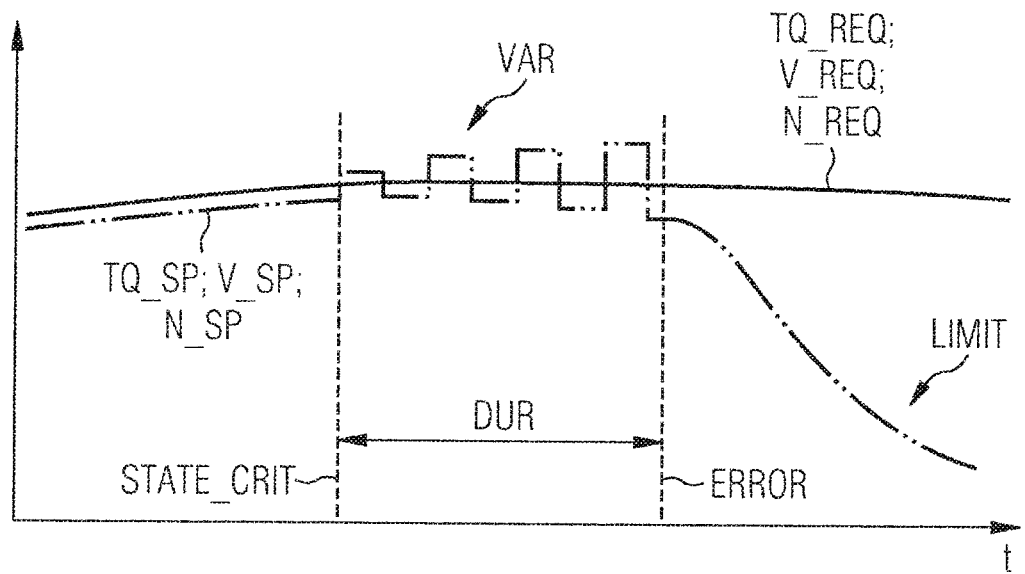
FIG. 4 shows a second setpoint value curve.

With progressive time duration DUR and/or with approaching and/or increasingly probable onset of the operating error (ERROR), the reaction of the drive system 4 and/or the perceptible reaction of the motor vehicle 2 is preferably increased (FIG. 4). This is preferably achieved by increasing the amplitude of the variation VAR.

Figure 5:
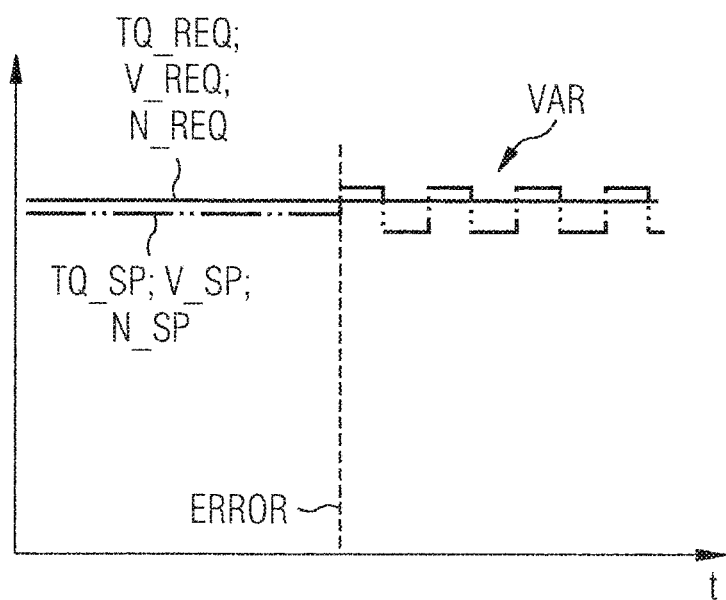
FIG. 5 shows a third setpoint value curve.

Alternatively or additionally, only the occurrence of the operating error (ERROR) can be signaled to the driver (FIG. 5). This is particularly advantageous when the drive system 4 switches over to limited operation (LIMIT) without a transitional mode characterized by the critical operating state STATE_CRIT and/or when the operating error (ERROR) occurs without the critical operating state STATE_CRIT being entered.

The invention is not limited to the exemplary embodiments specified. For example, any setpoint value of an actuator can be varied if this results in a reaction of the drive system 4 that is perceptible to the driver. In addition, the program can be used in any vehicle, e.g. an aircraft and/or a ship and/or a truck.

The invention claimed is:

1. A method for operating a motor vehicle having a motor vehicle drive system, the method comprising:
noting an occurrence including a critical operating state of the motor vehicle drive system, the critical operating state including a failure in a first actuator of the motor vehicle drive system, the motor vehicle drive system comprising at least one of an internal combustion engine and electric motor, the first actuator including at least one of a throttle valve, an intermittent charge valve, an injection valve, or a spark plug;
then, during a first time period, automatically signaling the occurrence to a driver of the motor vehicle by implementing a reaction of the motor vehicle drive system perceptible to the driver, the reaction of the motor vehicle drive system including oscillation of a second actuator of the motor vehicle around a predetermined set position, the second actuator affecting a torque or rpm of at least one of the engine and electric motor of the motor vehicle; and
at the end of the first time period, automatically implementing a limited operation of the motor vehicle.

2. The method in according to claim 1, further comprising:
evaluating the occurrence,
determining an intensity of the reaction of the motor vehicle drive system based at least in part on the evaluation of the occurrence, and
the reaction of the motor vehicle drive system is implemented with the determined intensity.

3. The method according to claim 1, wherein an intensity of the reaction of the motor vehicle drive system is increased during the first time period.

4. The method according to claim 1, wherein both (a) implementing the reaction of the motor vehicle drive system to signal the occurrence to the driver and (b) implementing the limited operation of the motor vehicle subsequent to the signaling involve controlling at least one of the engine and electric motor of the motor vehicle.

5. The method according to claim 1, wherein the first time period is a predetermined time period.

6. The method according to claim 1, further including varying a resistance of an accelerator pedal of the drive system.

7. The method according to claim 1, further comprising:
signaling the occurrence to the driver by a perceptible movement of a steering wheel of the motor vehicle.

8. An apparatus for operating a motor vehicle having a motor vehicle drive system, the apparatus configured to:
note an occurrence including a critical operating state of the motor vehicle drive system, the critical operating state including a failure in a first actuator of the drive system, the motor vehicle drive system comprising at least one of an internal combustion engine and electric motor, the first actuator including at least one of a throttle valve, an intermittent thane valve, an injection valve, or a spark plug;
in response to noting the occurrence:
during a first time period, automatically signal the occurrence to a driver of the motor vehicle by implementing a reaction of the motor vehicle drive system perceptible to the driver, the reaction of the motor vehicle drive system including oscillation of a second actuator of the motor vehicle around a predetermined set position, the second actuator affecting a condition chosen from a group consisting of: torque or rpm of an engine of the motor vehicle, and resistance of an accelerator pedal associated with the motor vehicle drive system; and
at the end of the first time period, automatically implement a limited operation of the motor vehicle.

9. The apparatus according to claim 8, further configured to evaluate the occurrence and, depending on the evaluation, to determine an intensity of the reaction of the motor vehicle drive system and to implement the reaction of the drive system with the determined intensity.

10. The apparatus according to claim 8, configured to increase an intensity of the reaction of the motor vehicle drive system during the first time period.

11. The apparatus according to claim 8, wherein both (a) implementing the reaction of the motor vehicle drive system to signal the occurrence to the driver and (b) implementing the limited operation of the motor vehicle subsequent to the signal involve controlling at least one of the engine and electric motor of the motor vehicle.

12. The apparatus according to claim 8, wherein the first time period is a predetermined time period.

13. The apparatus according to claim 8, further configured to vary a resistance of an accelerator pedal of the drive system.

14. The apparatus according to claim 8, wherein the occurrence is signaled to the driver by a perceptible movement of a steering wheel of the motor vehicle.

15. A method for operating a motor vehicle having a motor vehicle drive system, the method comprising:
detecting a critical operating state of the drive system of the motor vehicle, the critical operating state including a failure in a first actuator of the drive system, the motor vehicle drive system comprising at least one of an internal combustion engine and electric motor, the first actuator including at least one of a throttle valve, an intermittent charge valve, an injection valve, or a spark plug;

in response to detecting the critical operating state of the drive system of the motor vehicle, automatically initiating a signaling period during which the presence of the critical operating state is signaled to a driver of the motor vehicle by implementing a reaction of the motor vehicle drive system perceptible to the driver, the reaction of the motor vehicle drive system including oscillation of a second actuator around a predetermined set position, the second actuator affecting torque or rpm of at least one of the engine and electric motor of the motor vehicle;

detecting an operating error of the motor vehicle during the signaling period, and in response to detecting the operating error of the motor vehicle during the signaling period, automatically implementing a limited operation of the motor vehicle.

* * * * *